US007628535B2

(12) United States Patent
Vaz et al.

(10) Patent No.: US 7,628,535 B2
(45) Date of Patent: Dec. 8, 2009

(54) METHOD FOR ASCERTAINING INFORMATION ABOUT A DEVICE EXPOSED TO A TEMPERATURE

(75) Inventors: Rocco Gonzalez Vaz, Stuttgart (DE); Klaus Schwarze, Duderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 280 days.

(21) Appl. No.: 11/665,434

(22) PCT Filed: Oct. 11, 2005

(86) PCT No.: PCT/EP2005/055153

§ 371 (c)(1),
(2), (4) Date: Apr. 13, 2007

(87) PCT Pub. No.: WO2006/040316

PCT Pub. Date: Apr. 20, 2006

(65) Prior Publication Data

US 2008/0060428 A1 Mar. 13, 2008

(30) Foreign Application Priority Data

Oct. 16, 2004 (DE) ....................... 10 2004 050 769

(51) Int. Cl.
*G01K 3/00* (2006.01)

(52) U.S. Cl. ....................................... 374/102; 374/107

(58) Field of Classification Search ................. 374/102, 374/107; 60/274, 277, 276

See application file for complete search history.

(56) References Cited

U.S. PATENT DOCUMENTS

| | | | | |
|---|---|---|---|---|
| 5,325,664 | A * | 7/1994 | Seki et al. | 60/276 |
| 5,363,647 | A * | 11/1994 | Ohuchi et al. | 60/276 |
| 5,531,069 | A * | 7/1996 | Katsuhiko | 60/276 |
| 5,732,549 | A * | 3/1998 | Treinies et al. | 60/274 |
| 5,752,382 | A * | 5/1998 | Hanafusa et al. | 60/277 |
| 5,787,705 | A | 8/1998 | Thoreson et al. | |
| 5,896,743 | A * | 4/1999 | Griffin | 60/274 |
| 6,651,422 | B1 | 11/2003 | Legare | |
| 2003/0101019 | A1 | 5/2003 | Klausner et al. | |

FOREIGN PATENT DOCUMENTS

| | | |
|---|---|---|
| DE | 195 16 481 | 11/1996 |
| EP | 0 887 522 | 12/1998 |
| EP | 1 201 890 | 5/2002 |
| FR | 2 847 942 | 6/2004 |

* cited by examiner

*Primary Examiner*—Andre J Allen
(74) *Attorney, Agent, or Firm*—Kenyon & Kenyon LLP

(57) ABSTRACT

A method for ascertaining information about a device that has been exposed to a temperature, permitting a simple and reliable means of ascertaining information about the aging of the device. The temperature of the device is determined. Depending on the temperature or the temperature change achieved by the device, at least one counter is incremented. Information about the aging of the device is ascertained as a function of the counter reading achieved.

20 Claims, 4 Drawing Sheets

Fig. 1
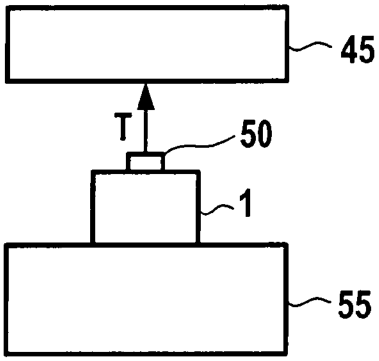
Fig. 2
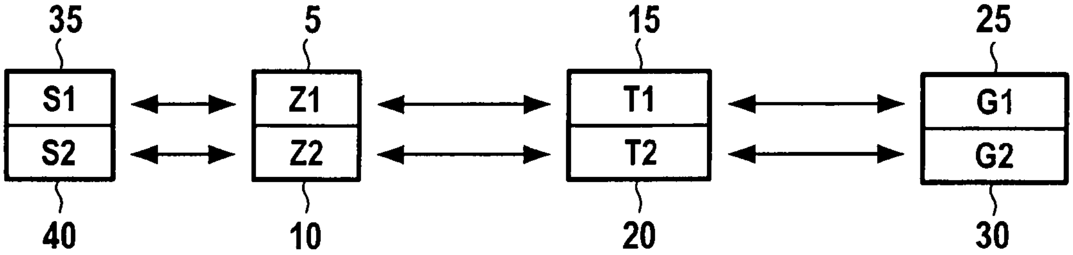
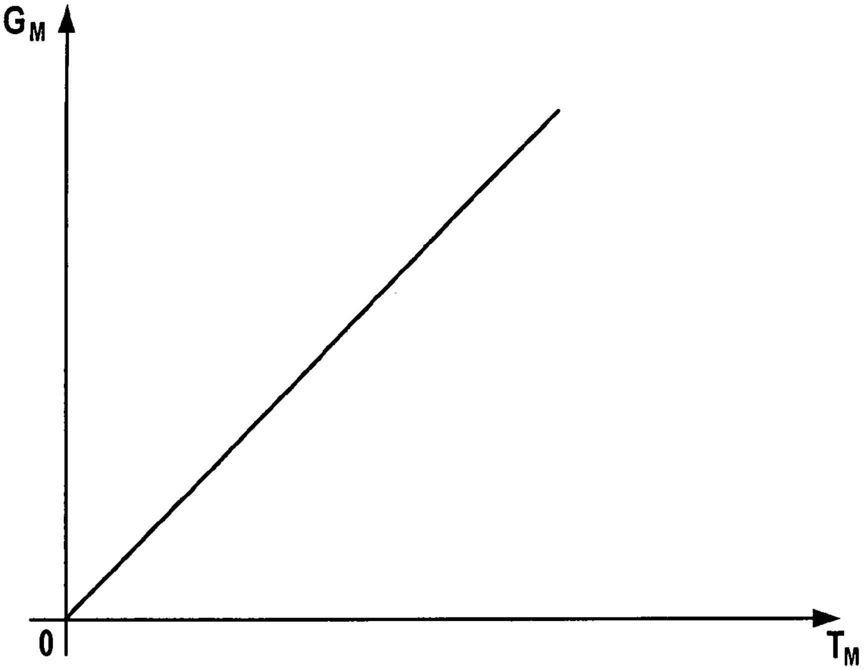
Fig. 3

METHOD FOR ASCERTAINING INFORMATION ABOUT A DEVICE EXPOSED TO A TEMPERATURE

FIELD OF THE INVENTION

The present invention is directed to a method for ascertaining information about a device exposed to a temperature.

BACKGROUND INFORMATION

Methods are already known for ascertaining information about a device exposed to a temperature, in which the temperature of the device is detected. For example, German Patent Application No. DE 195 164 81 A1 describes the computer-aided detection of a maximum temperature to which a control unit in a motor vehicle has been exposed. This has proven to be expedient because the fact that a control unit has been exposed to a high temperature may permit inferences about the probability of a future failure.

SUMMARY

An example method according to the present invention for ascertaining information about a device exposed to a temperature may have an advantage in that, depending on the temperature reached or the temperature change of the device, at least one counter is incremented, and information about aging of the device is ascertained as a function of the counter reading reached. It is possible in this way to ascertain aging of the device as a function of temperature in a particularly simple and reliable method involving little complexity. The life expectancy of the device, i.e., the remaining period of time until the device is destroyed or damaged or until an operating failure occurs because of the temperature influence, may thus be deduced in a particularly simple and reliable manner. It is thus possible in a particularly simple and reliable manner to promptly detect imminent failure or imminent damage to or destruction of the device.

The temperature dependence and/or the dependence on the temperature change of the aging of the device owing to the associated thermal stress may be taken into account in a particularly simple manner by selecting the increment of the at least one counter as a function of the temperature or as a function of the temperature change.

Accelerated aging of the device with an increase in temperature or with an increase in the absolute value of the temperature change may be taken into account particularly easily by increasing the increment with an increase in temperature or with an increase in the absolute value of the temperature change.

Another advantage may be obtained if the counter reading is compared with a predefined threshold value and a measure of the aging is derived from the difference between the counter reading and the predefined threshold value. It is possible in this way to ascertain the aging of the device in a particularly simple and not very complicated manner as a function of the counter reading reached.

It may also be advantageous if the difference between the counter reading and the predefined threshold value is weighted as a function of the temperature or the temperature change. This permits another simple option for expressing mathematically the aging of the device which is a function of the temperature or the temperature change and in particular for better resolving various related values for the aging of the device, i.e., making them better distinguishable.

This may be accomplished in a particularly relevant manner when the weighting is increased with an increase in temperature or with an increase in the absolute value of the temperature change. The effect of aging is then also increased.

Another advantage may be obtained if the predefined threshold value is dynamically adapted to the age of the device. Aging may thus be represented as an excess in relation to the actual age of the device and thus takes into account only such temperature effects and/or thermal stresses on the device which result in excessive wear on the device.

Another advantage may be obtained if the at least one counter is incremented only on reaching a first predefined temperature threshold or a first predefined temperature change threshold. This makes it possible to disregard temperature effects or thermal stresses on the device that have no significant effect on aging of the device.

Aging may be ascertained in a particularly differentiated manner if multiple counters are each assigned a different temperature threshold or temperature change threshold and if each counter is incremented only when the temperature threshold or temperature change threshold assigned to the corresponding counter has been reached. It is thus possible to ascertain a temperature profile of the device that is even more suitable for statistical analyses.

In this case, an even more relevant value for the aging of the device may be ascertained if a difference between the particular counter reading and a predefined threshold value is formed for each counter, if the differences thus formed are added up to form a sum and if a comparative value, in particular a difference between the sum and a predefined sum threshold value, is formed as a measure of the aging of the device.

The value for aging may be resolved even better, i.e., different temperature influences and/or thermal stresses on the device may be taken into account in a more differentiated manner, if the differences thus formed are weighted, in particular as a function of temperature or as a function of the temperature change.

Another advantage is obtained if the at least one counter is timed. In this way, the duration of a thermal stress on the device may also be taken into account in ascertaining the aging.

When using a clock rate for the at least one counter, the temperature influences and/or thermal stresses on the device may also be taken into account easily in ascertaining aging if the clock rate of the at least one counter is selected as a function of temperature or as a function of the temperature change.

This may be taken into account particularly easily if the clock rate is increased with an increase in temperature or with an increase in the absolute value of the temperature change because this also accelerates aging.

BRIEF DESCRIPTION OF THE DRAWINGS

Exemplary embodiments of the present invention are depicted in the figures and explained in greater detail below.

FIG. 1 shows a device exposed to thermal stress.

FIG. 2 shows an assignment of various temperatures to various counters, threshold values and weightings.

FIG. 3 shows a characteristic curve representing the relationship between a weighting and a temperature.

DESCRIPTION OF EXAMPLE EMBODIMENTS

Figure 4:
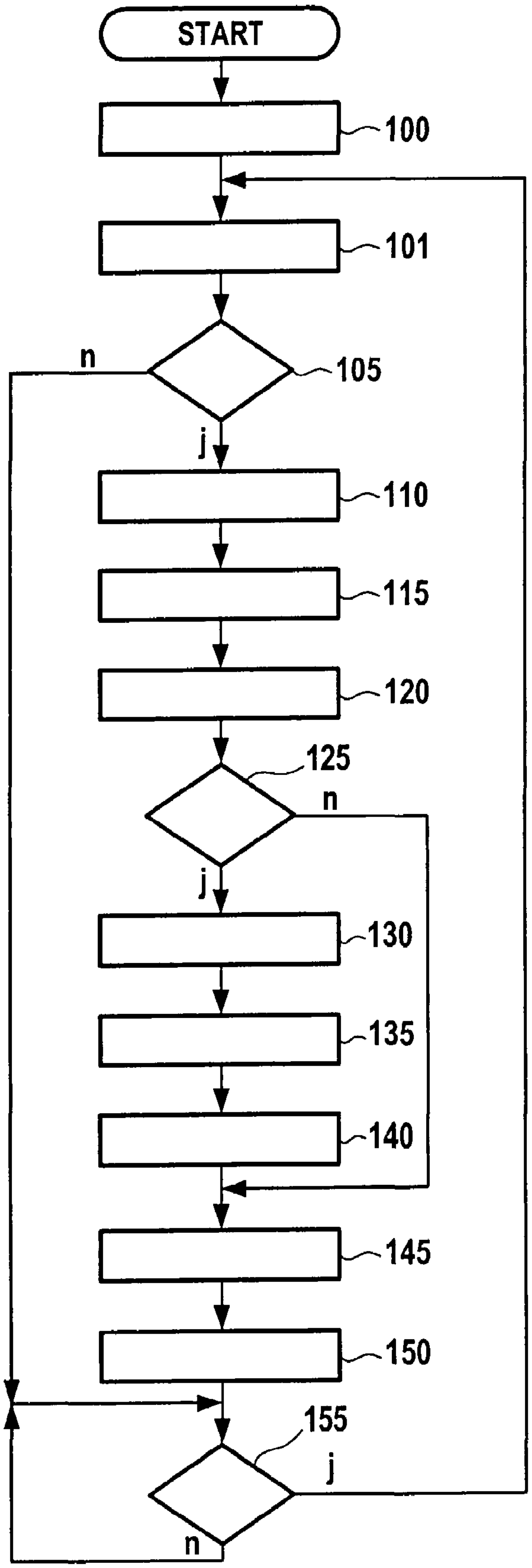
FIG. 4 shows a first flow chart for a first embodiment of the present invention.

FIG. 1 shows a carrier element 55 on which a device 1 is situated. Device 1 and carrier 55 are thermally linked, i.e., heating of carrier 55 also results in heating of device 1. This also applies to cooling of carrier 55, which results in cooling of device 1. A temperature sensor 50 is mounted in the area of device 1, measuring the temperature of device 1 and relaying this information in the form of a continuous measurement signal over time to an analyzer unit 45. As illustrated in the example of FIG. 1, temperature sensor 50 may also be mounted on device 1 or inside device 1, e.g., on a side wall of device 1. The arrangement of temperature sensor 50 should advantageously be such that it is able to detect the temperature of device 1 as accurately as possible. Device 1 may be any type of device, in the simplest case a body made of any material. In the present example, however, it shall be assumed that device 1 is the control unit of a motor vehicle, in particular a commercial vehicle. Such a control unit 1 is usually mounted directly on the engine block of such a commercial vehicle. Carrier 55 thus represents the engine block in this example. Control unit 1 is therefore exposed to an elevated thermal stress due to engine block 55. Due to the elevated temperature of engine block 55, the components of control unit 1, in particular the integrated circuits, capacitors, etc., are exposed to particularly high thermal stresses and therefore undergo more rapid aging.

According to the present invention, it is now provided that the aging of control unit 1 is ascertained in a simple and reliable manner. Aging is ascertained by analyzing the temperature measurement by temperature sensor 50 in analyzer unit 45, with analyzer unit 45 making available a measure of the aging of control unit 1.

According to a first exemplary embodiment, various memory cells, shown in FIG. 2, are situated in analyzer unit 45 or in a memory assigned to analyzer unit 45. A first predefined temperature value T1 is stored in a first temperature memory cell 15. A second predefined temperature value T2 is stored in a second temperature memory cell 20. A first weighting value G1 is stored in a first weighting memory cell 25. A second weighting value G2 is stored in a second weighting memory cell 30. First weighting memory cell 25 is assigned to first temperature memory cell 15 and second weighting memory cell 30 is assigned to second temperature memory cell 20. First weighting value G1 and second weighting value G2 are also fixedly predetermined. A first counting variable Z1 is stored in a first counter memory cell 5. A second counting variable Z2 is stored in a second counter memory cell 10. First counter memory cell 5 is assigned to first temperature memory cell 15 and second counter memory cell 10 is assigned to second temperature memory cell 20. In addition, a first threshold value memory cell 35 is provided, with a threshold value S1 being stored therein. In addition, a second threshold value memory cell 40 is provided, with a second threshold value S2 being stored therein. Two threshold values S1, S2 are fixedly predetermined. First threshold value memory cell 35 is assigned to first counter value memory cell 5, and second threshold value memory 40 is assigned to second counter memory cell 10. Temperature memory cells 15, 20, weighting memory cells 25, 30 and threshold value memory cells 35, 40 may each be designed as read-only memories or as EPROMs or EEPROMs. Counter memory cells 5, 10, however, may be designed as read-write memories. According to the first embodiment of the present invention, the first counting variable Z1 is incremented with a predefined value on reaching first temperature value T1. Second counting variable Z2 is incremented with the predefined value on reaching second temperature value T2. To ascertain the aging, the prevailing status of first counting variable Z1 is compared with first threshold value S1 by forming the difference, which is weighted with first weighting value G1. Similarly, second counting variable Z2 is compared with second threshold value S2 by forming the difference, which is weighted with second weighting value G2. It is assumed here that second temperature value T2 is greater than first temperature value T1. It is now possible to provide for the weighting to be greater with an increase in temperature. This means that second weighting value G2 is greater than first weighting value G1. The weighted differences are then added up and compared with a fixedly predefined total threshold value by forming the difference. This comparison is then a measure of the aging of control unit 1.

The first embodiment of the present invention is explained in greater detail below as an example on the basis of the flow chart in FIG. 4.

After the start of the program, e.g., at the time of the initial operation of the vehicle and therefore of control unit 1, analyzer unit 45 sets both first counting variable Z1 and second counting variable Z2 at the value zero. Additionally, a first differential value D1=S1−Z1 and a second differential value D2=S2−Z2 are formed. Furthermore, a first weighted product W1=D1*G1 and a second weighted product W2=D2*G2 are formed. The program then branches off to a program point 101.

For an operating cycle of control unit 1 characterized by the period of time between turning the ignition on and turning it off, for example, at program point 101 analyzer unit 45 ascertains maximum temperature $T_{max}$ of control unit 1 reached in this operating cycle from the curve of temperature T of control unit 1 over time as supplied by temperature sensor 50. This maximum temperature $T_{max}$ is thus fixed at the end of the operating cycle. After ascertaining maximum temperature $T_{max}$ at the end of the operating cycle, the program branches off to a program point 105.

At program point 105, analyzer unit 45 checks on whether maximum temperature $T_{max}$ is greater than or equal to first predefined temperature value T1. If this is the case, the program branches off to a program point 110, otherwise to a program point 155.

At program point 110, analyzer unit 45 increments first counting variable Z1 by a predefined increment value I, so that Z1=Z1+I is formed. The program then branches off to a program point 115.

At program point 115, analyzer unit 45 ascertains a new first differential value D1=S1−Z1. It then branches off to a program point 120.

At program point 120, analyzer unit 45 forms a new first weighted product W1=D1*G1. It then branches off to a program point 125.

At program point 125, analyzer unit 45 checks on whether maximum temperature $T_{max}$ is greater than or equal to second predefined temperature value T2. If this is the case, the program branches off to a program point 130; otherwise it branches off to a program point 145.

At program point 130, analyzer unit 45 increments second counting variable Z2 by predefined increment value I, so that Z2=Z2+I is formed. The program then branches off to a program point 135.

At program point 135, analyzer unit 45 forms a new second differential value D2=S2−Z2. The program then branches off to a program point 140.

At program point 140, analyzer unit 45 forms a new second weighted product W2=D2*G2. It then branches off to a program point 145.

At program point 145, analyzer unit 45 forms sum S=W1+W2. It then branches off to a program point 150.

At program point 150, analyzer unit 45 forms an aging value A=S−R, where R is a fixedly predefined reference value, which may also be selected to be zero. Aging value A is then supplied by analyzer unit 45 for further processing, for example, or is visually and/or acoustically reproduced for informing the driver of the vehicle. Aging value A thereby ascertained may also be compared at program point 150 with a fixedly predefined critical aging value $A_{crit}$. Critical aging value $A_{crit}$ is ascertained on a test bench, for example, by representing an aging of control unit 1 that is associated with a high probability of failure of 80%, for example. If aging value A ascertained at program point 150 then exceeds predefined critical aging value $A_{crit}$, analyzer unit 45 may in this case generate a warning and may prompt the driver to replace control unit 1. If aging value A ascertained at program point 150 falls below predefined critical aging value $A_{crit}$, the warning described here fails to occur. After program point 150, the program branches off to program point 155.

At program point 155, analyzer unit 45 checks on whether this is a new operating cycle of the vehicle, i.e., for example, whether the ignition has been turned on again. If this is the case, the program branches back to program point 101; otherwise it branches back to program point 155.

The first embodiment of the present invention was described using two temperature values T1, T2 and assigned counting variables Z1, Z2, assigned threshold values S1, S2 and assigned weighting values G1 and G2. Two threshold values S1 and S2, for example, may be selected to be equal, but they may also be selected to be different. For example, the threshold value may be selected to be smaller with an increase in temperature, i.e., S2<S1, which also results in a greater weighting of the influence of second temperature value T2, which is greater. In this case, both weighting values G1 and G2 may also be selected to be the same. If they are also selected to be different in this case, as described above, i.e., G2>G1, then the weighting effect is further emphasized. In general, however, more than two temperature values may also be preselected, in which case a counting variable, a threshold value and a weighting value are then assigned to each in the manner described above. In the flow chart in FIG. 4, the program part having four program steps 125, 130, 135, 140 is to be replicated similarly for each additional predefined temperature value, and it should be assumed that first temperature value T1 is the smallest of the predefined temperature values and the aforementioned particular program parts having the four program steps are run through successively in the direction of increasing predefined temperature values for the other predefined temperature values, the "no" branch always leading to program point 145 in a comparison of maximum temperature $T_{max}$ with the particular predefined temperature value except for the first predefined temperature value.

Figure 5:
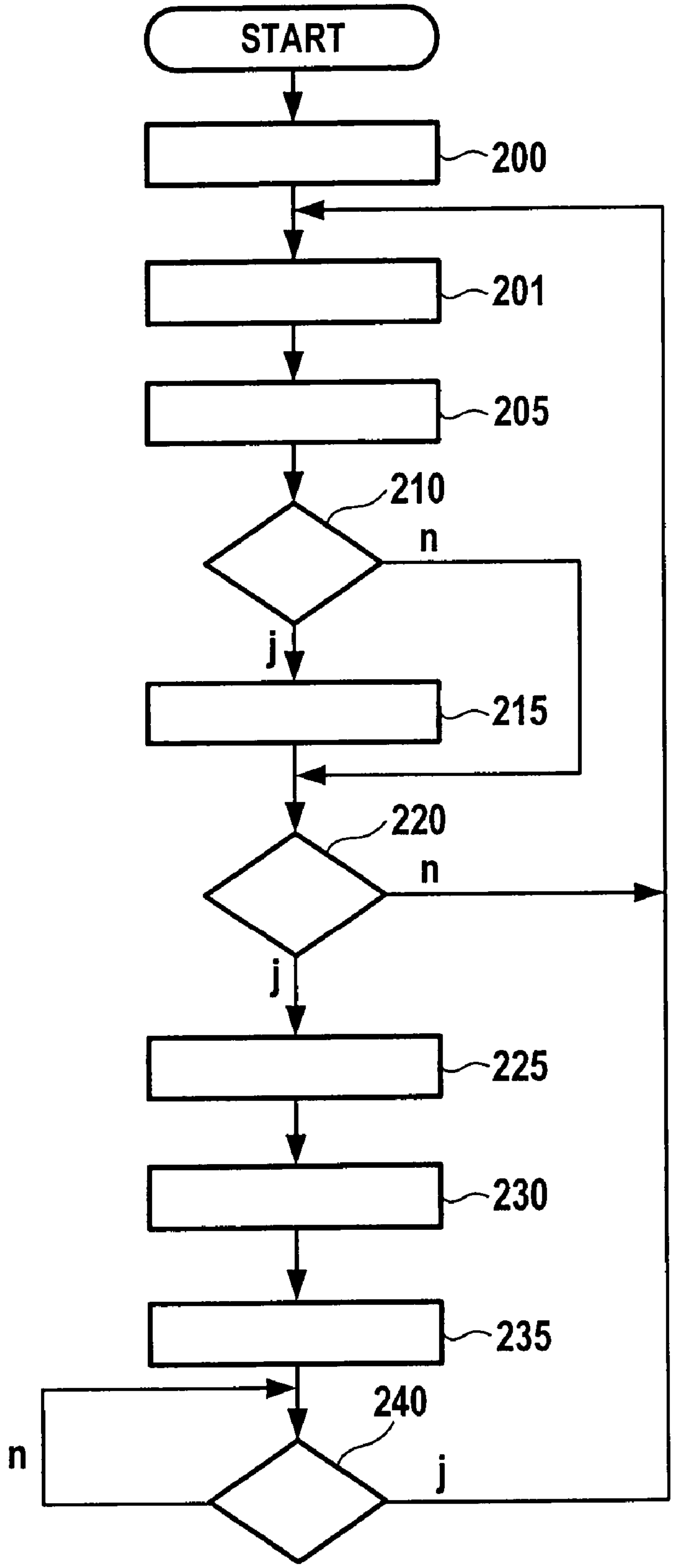
FIG. 5 shows a second flow chart for a second embodiment of the present invention.

According to a second embodiment, aging value A may also be ascertained in a less differentiated and therefore simpler manner than in the first embodiment. In this case, only a single counting variable Z is provided and is incremented with a weighting factor as a function of the temperature of control unit 1. The weighting may be selected to be greater with an increase in temperature, for example. To this end, a corresponding characteristic curve, e.g., according to FIG. 3, may be stored in analyzer unit 45 or in a memory assigned to analyzer unit 45. Various values for a temperature variable $T_M$ are each assigned a weighting value $G_M$ in this characteristic curve. According to FIG. 3, this characteristic curve is designed in such a way that weighting value $G_M$=0 is assigned to temperature variable $T_M$=0, and assigned weighting value $G_M$ also increases with an increase in the value of temperature variable $T_M$. The characteristic curve in FIG. 3 has a linear shape, for example, but may also be nonlinear. The difference in the resulting counting variables from a fixed predefined threshold value then yields the aging value of control unit 1 as a measure of its aging. FIG. 5 shows an example of a flow chart for this second embodiment.

After the start of the program, e.g., the first time the vehicle is started up, analyzer unit 45 initializes counting variable Z, which is now the only counting variable, at a value of zero at a program point 200, and at a subsequent program point 201 it also initializes temperature variable $T_M$ at a value of zero. Temperature variable $T_M$ is used to determine maximum temperature $T_{max}$ of control unit 1 during an operating cycle. The determination of this maximum temperature $T_{max}$ is explained below and may also be performed accordingly to ascertain maximum temperature $T_{max}$ according to the first embodiment at program point 101 in FIG. 4.

After program point 201, the program branches off to a program point 205.

At program point 205, analyzer unit 45 receives prevailing temperature T of control unit 1 from temperature sensor 50. It then branches off to a program point 210.

At program point 210, analyzer unit 45 checks on whether prevailing temperature T of control unit 1 is greater than temperature variable $T_M$. If this is the case, then the program branches off to a program point 215; otherwise it branches off to a program point 220.

At program point 215, analyzer unit 45 sets temperature variable $T_M$ at the value of prevailing temperature T of control unit 1, i.e., $T_M$=T. It then branches off to program point 220.

At program point 220, analyzer unit 45 checks on whether the operating cycle is concluded, i.e., for example, whether the ignition has been turned off. If this is the case, then it branches off to a program point 225; otherwise it branches back to program point 201.

At program point 225, analyzer unit 45 also reads weighting value $G_M$ assigned to temperature variable $T_M$ out of the engine characteristics map according to FIG. 3. It then branches off to a program point 230.

At program point 230, analyzer unit 45 increments counting variable Z by a predefined increment value J weighted with weighting value $G_M$ that has been read out, so that Z=Z+J*$G_M$ is formed. Predefined increment value J may be predefined as J=1, for example, so that Z=Z+$G_M$ is obtained at program point 230. The program then branches off to a program point 235.

At program point 235, analyzer unit 45 determines aging value A as A=Z−R, where R in turn represents a fixedly predefined reference value and may also be selected to be zero. Aging value A may be further analyzed as described for program point 150 according to the flow chart in FIG. 4. The program then branches off to a program point 240.

At program point 240, analyzer unit 45 checks on whether a new operating cycle has begun, e.g., whether the ignition has been turned on again. If this is the case, the program branches back to program point 201; otherwise it branches back to program point 240.

Figure 6:
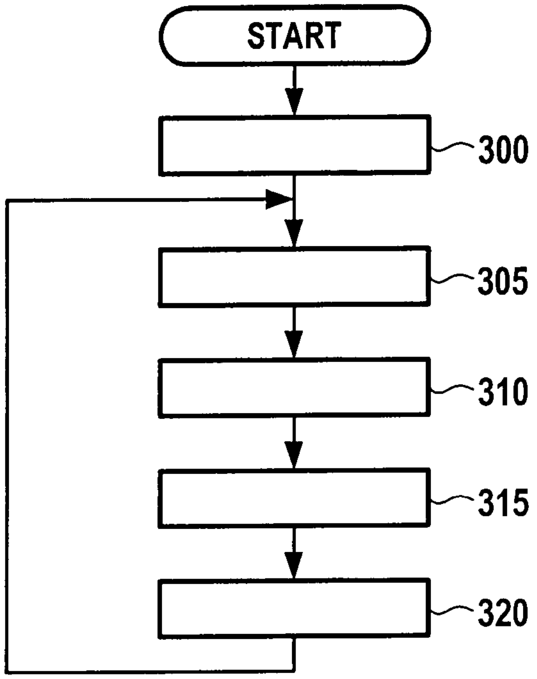
FIG. 6 shows a third flow chart for a third embodiment of the present invention.

According to a further, third embodiment, the single counting variable Z is operated in a timed manner. This makes it possible to integrate the temperature of control unit 1 over time, where the value of the integral is a measure of the aging of control unit 1. Counting variable Z in the third embodiment of the present invention is incremented so that it is timed with a constant clock rate and the magnitude of the particular increment is controlled as a function of prevailing temperature T of control unit 1. Various increment values may therefore be assigned to various temperatures of control unit 1, e.g., via a predefined characteristic curve by analogy with FIG. 3. In doing so, the increment values increase with an increase in prevailing temperature T of control unit 1. Depending on prevailing temperature T of control unit 1, counting variable Z is then incremented by the increment value assigned to this temperature in the particular characteristic curve. To ascertain aging value A, the counter reading of counting variable Z may be compared with a reference value RZ, which is adapted dynamically to the age of control unit 1. The difference between the counter reading of counting variable Z and dynamically formed reference value RZ is then a measure of the excess aging or thermal stress on control unit 1. Reference value RZ, which has been dynamically ascertained, may represent the age of control unit 1, for example. For the third embodiment of the present invention, FIG. 6 shows a flow chart as an example.

After the start of the program, analyzer unit 45 initializes counting variable Z at the value zero and reference value RZ likewise at the value zero at a program point 300. It then branches off to a program point 305.

At program point 305, analyzer unit 45 receives prevailing temperature T of control unit 1 from temperature sensor 50. It then branches off to a program point 310.

At program point 310, analyzer unit 45 ascertains an assigned increment value $I_T$ from prevailing temperature T with the help of the characteristic curve described here. It then branches off to a program point 315.

At program point 315, analyzer unit 45 increments counting variable Z by increment value $I_T$ ascertained previously at program point 310, so that $Z=Z+I_T$. In addition, analyzer unit 45 increments reference value RZ by a fixedly predefined increment value RZI at program point 315, so that RZ=RZ+RZI. Predefined increment RZI for the reference value is selected so that it corresponds to the time required by the program until subsequently reaching program point 315 in a subsequent program run. In this way, reference value RZ represents the actual age of control unit 1. The program next branches off to a program point 320.

At program point 320, analyzer unit 45 ascertains aging value A as being A=Z−RZ, i.e., the difference between the prevailing counter reading of counting variable Z and the prevailing reference value. This aging value A thus represents an aging effect that goes beyond the actual age of control unit 1, i.e., an excessive aging effect due to thermal stress on control unit 1. Aging value A may then be processed further as described with regard to program point 150 in FIG. 4. The program then branches back to program point 305.

Program steps 305, 310, 315, 320 are then repeatedly run through in the counting cycle. Predefined value RZI for the increment of the reference value thus corresponds to the period of the counting cycle.

The period for the clock rate for incrementing the counting variables may be selected to be equal to one-quarter of an hour, for example. Predefined value RZI for the increment of reference value RZ is then also selected to be equal to one-quarter hour, so that after one hour, the value of one hour is also obtained for reference value RZ. The characteristic curve for assignment of prevailing temperature T to increment value $I_T$ of counting variables Z may have a linear shape as in FIG. 3. However, it may also be nonlinear, in particular based on the threshold value. For example, increment value $I_T$ for counting variable Z may be selected to be equal to one-quarter hour for counting variable Z in the range of prevailing temperatures T of control unit 1 of less than or equal to 60° C. For prevailing temperatures T of the control unit greater than 60° C. and less than or equal to 90° C., increment value $I_T$ may be selected to be equal to one-half hour, for example, and for prevailing temperatures T of control unit 1 greater than 90° C., increment value $I_T$ for counting variable Z may be selected to be equal to three quarters of an hour. In this way, a time which may be greater than reference value RZ is obtained as the counter reading of counter variables Z and thus the actual age of control unit 1. The operational aging or overaging of control unit 1 is then obtained, as described above, as the difference between the age represented by counting variable Z and the actual age of control unit 1 represented by reference value RZ.

Figure 7:
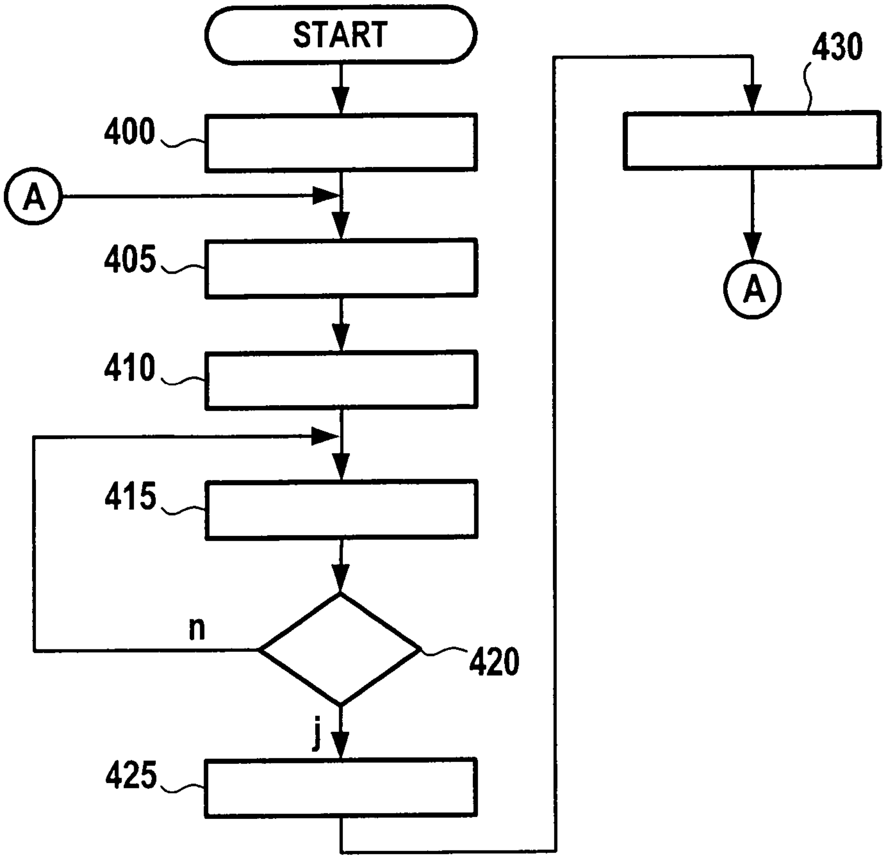
FIG. 7 shows a fourth flow chart for a fourth embodiment of the present invention.

According to a fourth embodiment of the present invention, single counting variable Z is always incremented by a constant increment value per clock cycle. However, the clock rate at which counting variable Z is incremented is varied as a function of the temperature of control unit 1. As the temperature of control unit 1 goes higher, the counting clock pulse with which counting variable Z is incremented is selected to be faster. The fourth embodiment of the present invention will now be described in greater detail on the basis of an exemplary flow chart according to FIG. 7. After the start of the program, analyzer unit 45 initializes the single counting variable Z at the value zero at a program point 400. Accordingly, analyzer unit 45 initializes reference value RZ at the value zero at program point 400. The program then branches off to a program point 405.

At program point 405, analyzer unit 45 receives from temperature sensor 50 prevailing temperature T of control unit 1. The program then branches off to a program point 410.

At program point 410, analyzer unit 45 ascertains an assigned clock rate for incrementing counting variables Z from prevailing temperature T of control unit 1, e.g., with the help of a predefined characteristic curve. The program then branches off to a program point 415.

At program point 415, analyzer unit 45 increments the single counting variable Z by a fixedly predefined increment value K, yielding Z=Z+K. The program then branches off to a program point 420.

At program point 420, analyzer unit 45 checks on whether the period length of a fixedly predefined basic clock rate has been reached since running through program point 405. This period length of the basic clock rate is equal to or greater than the period of the clock rate for counting variable Z ascertained from the characteristic curve at program point 410. The period length of the basic clock rate corresponds to a quarter hour, for example. If at program point 420 analyzer unit 45 ascertains that the period length of the basic clock rate has not yet been reached, then the program branches off to,a program point 425; otherwise, it branches back to program point 415 and runs through program point 415 again after the period of the clock rate derived at program point 410 has elapsed.

At program point 425, reference value RZ is incremented by analyzer unit 45 by a fixedly predefined increment L, so that RZ=RZ+L, where L may be equal to K, L being selected advantageously to be equal to the period of the basic clock rate, so that reference value RZ represents the actual age of control unit 1, as is also the case in the third embodiment. After program point 425, the program branches off to a program point 430.

At program point 430, analyzer unit 45 ascertains aging value A=Z−RZ similarly to program point 320 in FIG. 6 and sends it for further processing, if necessary, as described for program point 150 in FIG. 4, for example. The program then branches back to program point 405.

Thus, according to the fourth embodiment, for example, the basic clock rate may be selected as described, so that its period amounts to one quarter hour, for example, so that reference value RZ that is ascertained indicates the actual age of control unit 1. Depending on the temperature of control unit 1, the clock rate to be adjusted for counting variable Z may then be selected according to the characteristic curve that has been described, so that its period becomes shorter with an increase in temperature, the clock rate that is to be set for counting variable Z being selected in any case to be greater than or equal to the basic clock rate. The basic characteristic curve may be linear according to FIG. 3 or nonlinear, as described with regard to the third embodiment, e.g., individual temperature ranges may be assigned to a different clock rate to be set for counting variable Z. It is thus possible, for example, to provide for the clock rate that is to be set for counting variable Z for prevailing temperatures T of control unit 1 ≦60° C. to be selected to be equal to the basic clock rate. For prevailing temperatures T of control unit 1 >60° C. and ≦90° C., the clock rate to be set for counting variable Z may be selected so that it has a period of only ten minutes, for example. For prevailing temperatures T of control unit 1 >90° C., the clock rate to be set for counting variable Z may be selected so that its period is only six minutes long, for example.

According to another alternative embodiment of the present invention, against the background of the third embodiment and/or the fourth embodiment, the minimum increment for counting variable Z in the third embodiment and/or the minimum clock rate for counter variable Z according to the fourth embodiment may be equal to zero. In this case, counting variable Z is incremented only when a temperature threshold value of 60° C., for example, is exceeded. This has the advantage that the counter readings of counting variables Z remain comparatively low. Determination of reference value RZ may also be omitted because the counter readings of counting variables Z then represent a direct measure of the aging of control unit 1. This presupposes that the temperature threshold is selected suitably, so that for prevailing temperatures of control unit 1 below this temperature threshold value, there is no excessive aging, but excessive aging of control unit 1 may be expected for prevailing temperatures of control unit 1 above the temperature threshold value.

In general, the basic clock rate need not be preselected so that its period corresponds to the actual aging of control unit 1. In particular, in the case of the comparatively slowly changing temperatures of control unit 1, the basic clock rate may also be selected to be smaller, and in the case of rapidly changing temperatures of control unit 1, the basic clock rate may also be selected to be larger. The greater the basic clock rate selected, the more frequently counting variable Z will be incremented in the third and fourth embodiments, so that more rapidly changing temperatures of control unit 1 may also be taken into account and/or resolved better for the determination of aging value A.

According to another embodiment, a combination of the third embodiment and the fourth embodiment is also possible, so that, depending on prevailing temperature T of control unit 1, the clock rate for incrementing counting variables Z as well as increment value K for incrementing counting variables Z may be selected as a function of temperature accordingly. In this way, the aging effect may be better illustrated and/or resolved by resulting aging value A. In addition, it is also possible to design the counting variables to be timed in the first embodiment described, so that here again, the clock rate for incrementing the various counting variables may be performed as a function of temperature, and resulting aging value A may also be resolved better.

By analogy with the procedure described here with regard to ascertaining the aging of control unit 1 as a function of the temperature of control unit 1, the aging value may also be ascertained as a function of the temperature change of control unit 1, to which end in analyzer unit 45 it is merely necessary to form the gradient over time of prevailing temperature T of control unit 1 received by temperature sensor 50. With this temperature gradient, it is possible to proceed in the same way as with the temperature in the embodiment described above. It is also possible to ascertain an aging value as a function of temperature as well as an aging value as a function of the temperature change of control unit 1 and to add the two aging values in a weighted or unweighted form to obtain a resulting aging value. This resulting aging value may then be compared with critical aging value $A_{crit}$ as described previously, this critical aging value $A_{crit}$ being preselected in this case to take into account the temperature as well as the temperature change of control unit 1. Finally, thermal stresses on control unit 1 occur not only due to the temperature itself but also due to the temperature change over time, i.e., the temperature gradient over time as described here. When a temperature change is mentioned here, it always refers to the temperature change over time. In the case of the first embodiment, for example, at least one counting variable may be provided, which is incremented as a function of temperature and at least one other counting variable which is incremented as a function of the temperature change. In this case, the flow chart according to FIG. 4 may be run through once for the counting variables in the form described here, which are incremented as a function of temperature and separately from that for the counting variables, which are incremented as a function of the temperature gradient over time. In the case of the temperature gradient over time in the first embodiment, the absolute value of the maximum temperature gradient over time is to be used accordingly. The two resulting aging values for the counting variables, which are incremented as a function of the temperature of control unit 1, and the counting variables, which are incremented as a function of the temperature gradient over time, may then be added to a resulting aging value, weighted in particular, as described above.

When using the temperature gradient over time, the above statements for increasing temperatures also apply accordingly for increasing absolute values of the temperature change over time. Even a reduction in temperature over time and thus a negative temperature gradient over time may also constitute a substantial thermal stress on control unit 1. Weighting values G1, G2 according to the first embodiment may thus be selected so that both are equal to one, for example, in which case there is no more weighting. Furthermore, only one of two weighting values G1, G2 may be selected to be equal to one, so there is no weighting for the assigned temperature value.

By timely warning of the driver before control unit 1 fails, the number of failures because of defective control units may be reduced. The probability of failure is also a measure of the period of time yet to be expected during which control unit 1 will not be destroyed or damaged by the thermal stress.

The counting variables in the exemplary embodiments described above ultimately represent counters and may also be referred to as such.

What is claimed is:

1. A method for ascertaining information about a device which is exposed to a temperature, comprising:

detecting a temperature of the device;

incrementing at least one counter as a function of one of a temperature reached and a temperature change of the device; and ascertaining information about aging of the device as a function of a reading of the counter;

wherein:

the reading of the counter is compared with a predefined threshold value and a measure for the aging is derived from a difference between the reading of the counter and the predefined threshold value; and the predefined threshold value is adapted dynamically to an age of the device.

2. The method as recited in claim 1, wherein an increment of the at least one counter is selected as a function of the at least one of the temperature or the function of the temperature change.

3. The method as recited in claim 2, wherein the increment is increased with an increase in temperature or with an increase in an absolute value of the temperature change.

4. The method as recited in claim 1, wherein the difference between the readings and the at least one predefined threshold value is weighted as a function of the temperature or as a function of the temperature change.

5. The method as recited in claim 4, wherein the weighting is increased with an increase in temperature or with an increase in the absolute value of the temperature change.

6. The method as recited in claim 1, wherein the at least one counter is incremented only on reaching a first predefined temperature threshold or a first predefined temperature change threshold.

7. The method as recited in claim 1, wherein the at least one counter is timed.

8. The method as recited in claim 7, wherein a clock rate of the at least one counter is selected as a function of temperature or as a function of the temperature change.

9. The method as recited in claim 8, wherein the clock rate is increased with an increase in the at least one of the temperature or increase in an absolute value of the temperature change.

10. A method for ascertaining information about a device which is exposed to a temperature, comprising:

detecting a temperature of the device;

incrementing at least one counter as a function of one of a temperature reached and a temperature change of the device; and ascertaining information about aging of the device as a function of a reading of the at least one counter;

wherein multiple counters are each assigned a different temperature threshold or temperature change threshold and each of the counters is incremented only on reaching the temperature threshold, or temperature change threshold assigned to the corresponding counter.

11. The method as recited in claim 10, wherein each counter's reading is compared with at least one predefined threshold value and a measure for the aging is derived from a difference between the readings and the at least one predefined threshold value.

12. The method as recite in claim 11, further comprising:

adding the difference between each of the readings and the at least one predefined threshold value to obtain a sum, wherein the measure for the aging is derived from the sum.

13. The method as recite in claim 11, wherein:

the reading of a first one of the counters is compared with a first predefined threshold value to obtain a first difference and the reading of a second of the counters is compared with a second predefined threshold value to obtain a second difference; and the measure for the aging is derived based on both differences.

14. The method of claim 13, further comprising:

adding the first and second differences to obtain a sum, wherein the measure for the aging is derived from the sum.

15. The method as recited in claim 10, wherein a difference between a reading of the assigned counter and a predefined threshold value is formed for each of the counters; the differences are added to yield a sum, and a difference between the sum and a predefined sum threshold value is formed as a measure of the aging of the device.

16. The method as recited in claim 15, wherein the differences are weighted as a function of at least one of the temperature or the temperature change.

17. A system for ascertaining information about a device which is exposed to a temperature, comprising:

a processor configured to:

obtain a detected temperature of the device;

increment multiple counters as a function of one of a temperature reached and a temperature change of the device; and ascertain information about aging of the device as a function of readings of the counters;

wherein each of the multiple counters is:

assigned a different temperature threshold or temperature change threshold; and incremented only on reaching the temperature threshold or temperature change threshold assigned to the respective counter.

18. The system as recited in claim 17, wherein an increment of the counters is selected as a function of the at least one of the temperature or the function of the temperature change.

19. The system as recited in claim 18, wherein the increment is increased with an increase in temperature or with an increase in an absolute value of the temperature change.

20. The system as recited in claim 17, wherein the processor is configured to compare each counter's reading with at least one predefined threshold value and derive a measure for the aging from a difference between the readings and the at least one predefined threshold value.

* * * * *